United States Patent [19]

Arnau

[11] Patent Number: 5,527,435

[45] Date of Patent: Jun. 18, 1996

[54] DEVICE FOR CLAMPING A PART AND APPLICATION TO THE MACHINING OF A TURBINE ENGINE BLADE BY ELECTROCHEMISTRY

[75] Inventor: Jean-Philippe Arnau, Roissy En France, France

[73] Assignee: Societe Nationale d'Etude et de Construction de Moteurs d'Aviation "Snecma", Paris, France

[21] Appl. No.: 305,337

[22] Filed: Sep. 15, 1994

[30] Foreign Application Priority Data

Sep. 16, 1993 [FR] France ................................ 93 11024

[51] Int. Cl.$^6$ ........................ B23H 3/00; B23H 9/10; B25B 1/08; B25B 5/08
[52] U.S. Cl. ............. 205/640; 204/224 M; 204/297 R; 269/231; 269/235
[58] Field of Search ................................ 269/231, 235; 204/297 R, 224 M, 129.1

[56] References Cited

U.S. PATENT DOCUMENTS

| | | |
|---|---|---|
| 3,407,855 | 10/1968 | Ritchie . |
| 3,457,828 | 7/1969 | Durham ............................ 269/231 X |
| 3,503,602 | 3/1970 | Waara .................................. 269/235 |
| 4,033,569 | 7/1977 | Dunn . |
| 4,501,413 | 2/1985 | Illmann et al. ...................... 269/235 X |
| 4,598,453 | 7/1986 | Wills .................................. 269/231 X |
| 4,697,799 | 10/1987 | Wickham et al. .................. 269/231 X |
| 4,805,888 | 2/1989 | Bishop ................................ 269/235 X |

FOREIGN PATENT DOCUMENTS

| | | |
|---|---|---|
| 487118 | 2/1949 | Belgium . |
| 2407048 | 5/1979 | France . |
| 1765853 | 10/1971 | Germany . |
| 1239222 | 7/1971 | United Kingdom ............... 204/297 R |
| 2021645 | 12/1979 | United Kingdom . |
| 1586459 | 3/1981 | United Kingdom . |

Primary Examiner—Donald R. Valentine
Attorney, Agent, or Firm—Oblon, Spivak, McClelland, Maier & Neustadt

[57] ABSTRACT

The clamping system makes it possible to hold a free portion of a part during operations performed thereon. The device includes a plurality of blocks, each integral either with a pin or with a tube equipped with a small operating lever. The assembly is mounted in a gripping base between two shoulders. Gripping of each block in the clamping position is accomplished by a screw and two plates which make it possible to lock the assembly. The clamping system permits clamping of turbojet blades during the electrochemical machining or milling operation thereon.

6 Claims, 3 Drawing Sheets

DEVICE FOR CLAMPING A PART AND APPLICATION TO THE MACHINING OF A TURBINE ENGINE BLADE BY ELECTROCHEMISTRY

BACKGROUND OF THE INVENTION

1. Field of the Invention

The invention relates to the clamping or locking of a part in a given position in which it is to undergo one or more operations, such as machining and in particular machining or milling by electrochemistry. The clamping system according to the invention more particularly relates to the holding of fragile or very thin portions of the part to be worked and which are liable to move or vibrate during machining.

2. Description of the Prior Art

Reference is firstly made to FIG. 1. In connection with the manufacture of the blades of compressors of turbine engines, such as turbo-jets, there is a need to finish the shaping of the two functional surfaces of the blades by electrochemical machining. It is pointed out that the blade is firstly shaped by forging so as to provide a blank.

FIG. 1, which shows this electrochemical finishing phase, reveals all the essential elements for this operation, even for the prior art. Thus, it is possible to see the part 1 fixed by its foot or root 1A in a fixing block 5, the entity being placed within a machining cage 3. The upper portion has one or more electrochemical liquid intakes 4 and the lower portion has an outlet 7 for said same electrochemical liquid. Thus, there is a circulation of said electrochemical liquid around the blade 1 to be shaped.

This shaping is obtained by means of two electrodes 2, the shape of the ends of which is complimentary to that of the lateral faces of the blade 1. The blank of the blade 1 is fixed by its root 1A in the fixing block 5, the electrodes 2 being approached by said two lateral surfaces of the blade 1. The blade is connected to the positive terminal of the system, while the electrodes 2 are connected to the negative terminal. Thus, ions are torn away from the two lateral surfaces of the blade 1. Thus, within a few minutes, advancing the electrodes makes it possible to reduce the blade blank thickness from 5 to approximately 1 mm or less.

As from such reduced thicknesses vibration phenomena occur, particularly if the blade is longer than a few centimeters. Obviously the vibration phenomenon is prejudicial to the quality of the finish of the two faces of the blade 1.

However, as electrochemical machining is not a mechanical machining process, it is merely necessary for the part to be correctly positioned during machining, unlike in conventional machining where it is necessary for the part to be very firmly locked on the stand.

SUMMARY OF THE INVENTION

The object of the invention is to obviate the aforementioned disadvantages by proposing a system for clamping the part in order to carry out machining by electrochemistry.

To this end, the main object of the invention is to provide a device for clamping a free, flat portion of a part to be worked in order to completely immobilize the part during the work to be carried out thereon. The device comprises a base and, according to the invention, also includes multi-point gripping means of the free portion at several points distributed on either side of the two faces of the free portion of the part to be held and a single means for locking the gripping means in the gripping position.

These gripping means comprise on either side of the free portion of the part, a first gripping block mounted in an offset manner on a first end of a pivot pin, which is itself pivotably mounted in a gripping shoulder of the base, a first lever being installed at the second end of said pivot pin, in such way that a first occurrence of pressure on the two levers leads to pressure of each block being applied on one face of the free portion of the part, so as to maintain the free portion of the part between the two gripping shoulders.

Preferably, the locking means comprises the two gripping shoulders of the base in each of which is mounted a rotary manner a pivot pin, a gripping screw traversing the base and being parallel to the pin and a first plate in which is screwed the screw, so as to be gripped by the gripping screw against a first lateral face of the first plate.

In the case where there are four gripping points, the gripping means have on either side of the part a second gripping block mounted in an offset manner on a first end of a pivoting tube, which pivots about the pivot pin of the first plate, a second lever being mounted at its second end, so that a pressure on the levers leads to a pressure on each plate on one face of the free portion of the part, so as to hold the free portion of the part to be held by four gripping points between the two gripping shoulders.

In this case, use is made of a second plate free in translation on a second end of the gripping rod for gripping against a first lateral face of the second plate in order to grip by means of the screw said block against a gripping shoulder by their second lateral face.

In the case of a gripping with 2N points, the gripping means comprise on either side N-2 supplementary blocks each mounted in an offcentered manner on a tube concentric to the pivot pin and to the first pivoting tube, the locking means comprising N-2 supplementary gripping spacers on either side in order to grip each block against one gripping face of the gripping shoulder or a spacer.

The main use of the device according to the invention is for retaining a turbine engine blade already held by its root for the final machining of the faces of said blades by electrochemistry.

BRIEF DESCRIPTION OF THE DRAWINGS

The invention and its various technical features are described in greater detail hereinafter relative to non-limitative embodiments and the attached drawings, wherein show.

DESCRIPTION OF THE PREFERRED EMBODIMENT

Referring once again to FIG. 1, the clamping device according to the invention is designated in general terms by the reference number 10. It is positioned within the machining block 3 below the blade 1 so as to retain the free end 1B of said blade 1, the gripping action being symbolized by arrows. This shows that even if the blade 1, during its machining by electrochemistry, becomes very thin, its previously free end 1B is held in place. The latter has no opportunity to vibrate.

Figure 2:
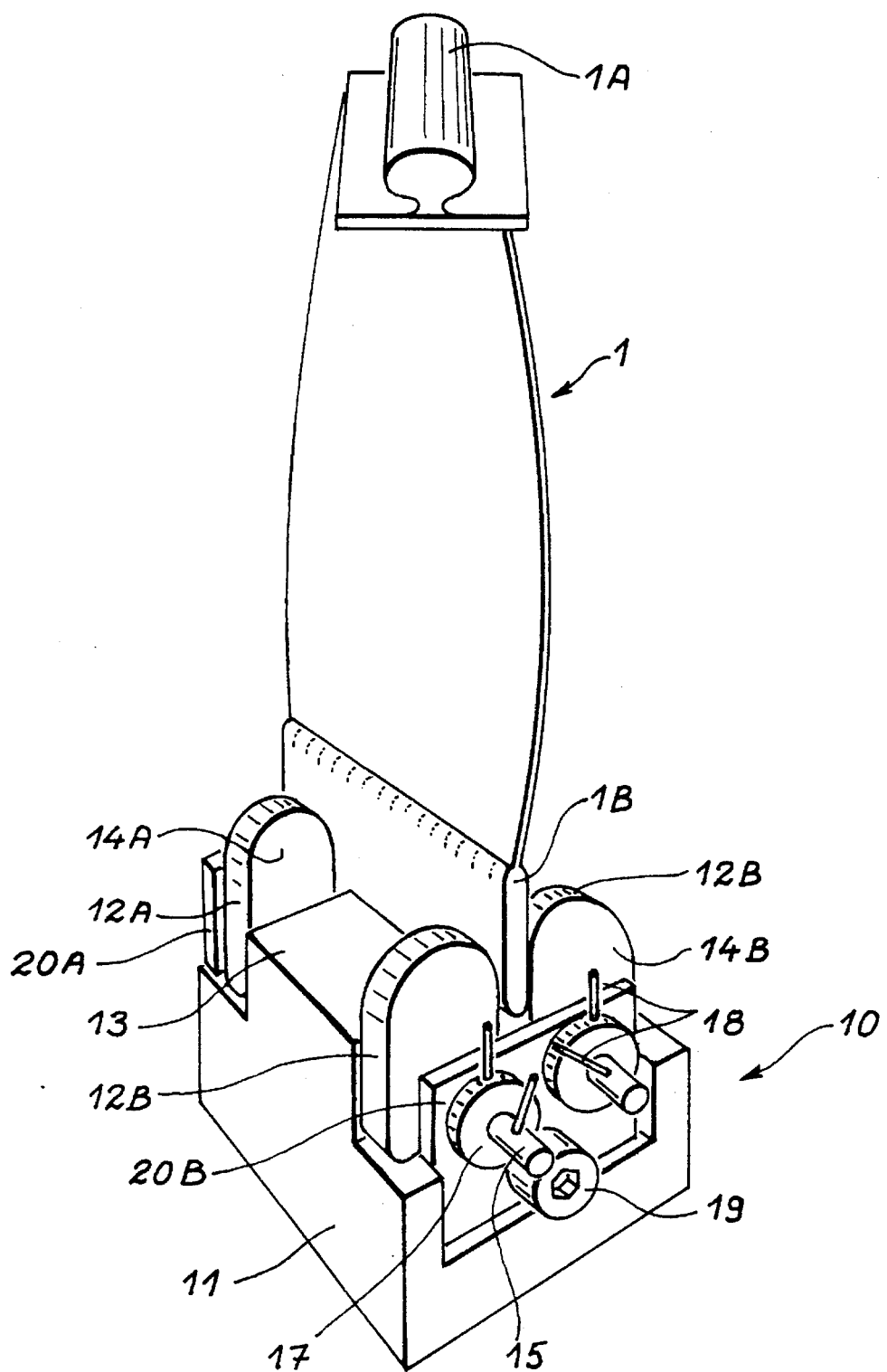
FIG. 2 The clamping device according to the invention in its four point version.

With reference to FIG. 2, the blade 1 is gripped by its free end 1B in the clamping device according to the invention 10. In the embodiment shown in FIG. 2, it is a clamping device having four gripping points. The latter are symbolized by four blocks, of which three are visible. In the present case they are the first block 12A and two second blocks 12B.

The clamping device 10 is described in the following paragraphs with reference to its left-hand side which is more visible than its right-hand side. Such a clamping device also comprises a base 11 having on each side a centrally positioned gripping shoulder 13. Each gripping shoulder 13 is traversed by a horizontal hole (not shown) in which is placed a pivot pin 15 surrounded by a pivoting tube 17. The pivot pin 15 is integral with the first block 12A, whilst the pivoting tube 17 is integral with a second block 12B. The two blocks 12A, 12B are placed on either side of the gripping shoulder 13. In addition, they are fixed to their pivot pin 15 and pivoting tube 17 in an offcentered manner. Thus, when the pivot pin 15 or pivoting tube 17 thereof is turned, such bring about a gripping of the free portion 1B of the blade 1 placed in the center of the base 11.

Thus, it is possible to form a line of a number N of gripping points on the basis of a number N-1 of gripping spacers (not shown). For this purpose it is merely necessary to provide a total number N-1 of concentric pivoting tubes 17 installed around the pivot pin 15. This possibility will be described in greater detail relative to FIG. 3.

Still referring to FIG. 2, locking in the gripping position of the blocks 12A, 12B is obtained by rotating, either the pivot pin 15 or the pivoting tube 17, which are integral therewith and making use of small levers 18, integral in each case with one of said rotating elements. This gripping can be brought about by an operator using several of his fingers. Bearing in mind that the pressure to be exerted is not intense, this operation can be carried out by one hand, the second hand being used for locking the system.

For this purpose the system comprises a gripping screw 19 in the form of an Allen screw. It is fitted so as to rotate freely in the base 11 and passes beyond the other side of said base where it is screwed into a first plate 20A. The head of the screw 19 bears in translation against a second plate 20B. In this manner, the screwing of the screw into the first plate 20A is used for the following stack: first plate 20A, first block 12A, gripping shoulder 13, second block 12B and second plate 20B.

All the blocks 12A, 12B are consequently locked in their given respective angular positions by the fingers of the operator acting on the levers 18. Thus, the blade 1 is clamped for the electrochemical machining operations.

Figure 3:
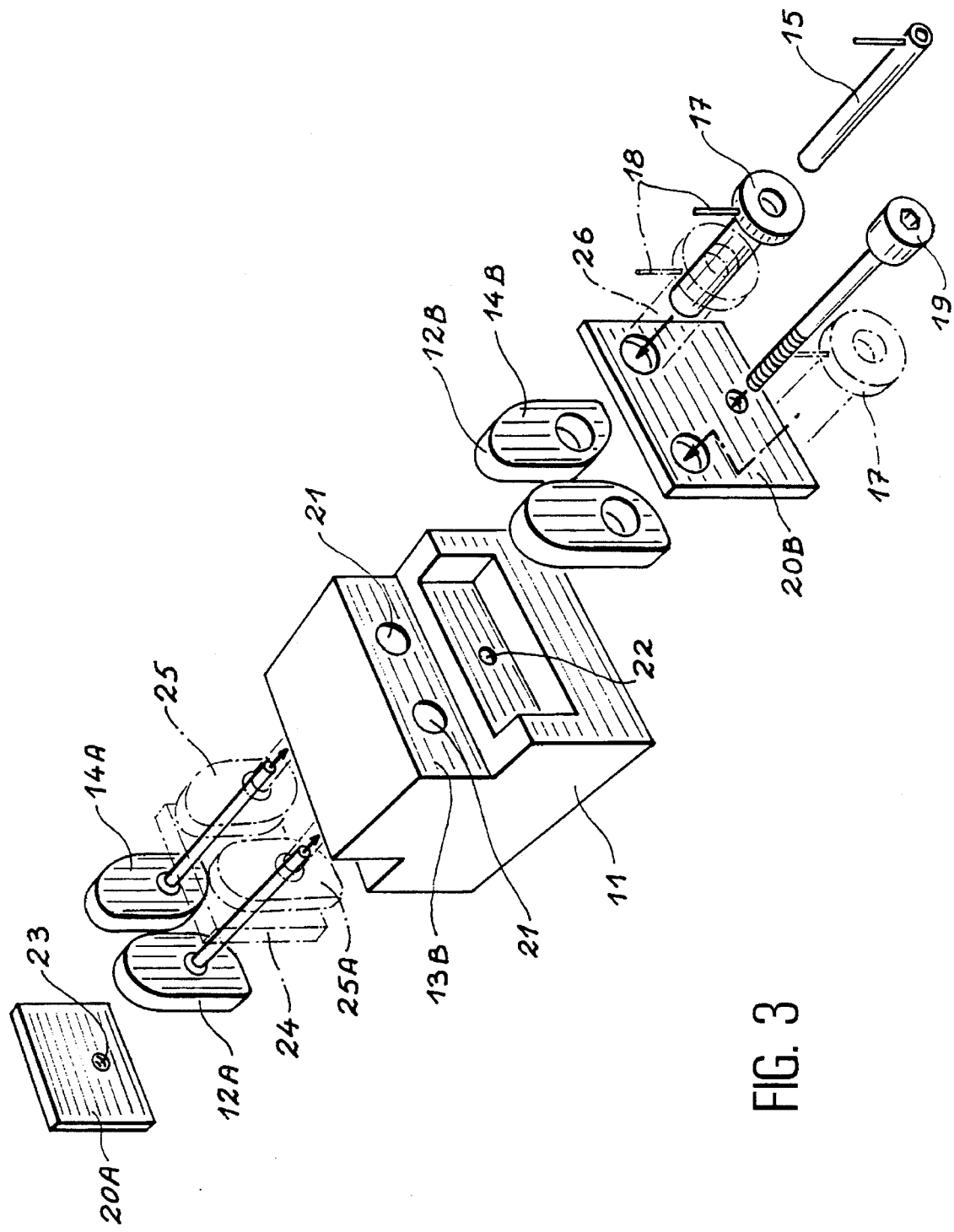
FIG. 3 An exploded view of the clamping device according to the invention.

FIG. 3 shows the arrangement in an exploded form. It once again shows the base 11, the blocks 12A, 12B, the plates 20A, 20B and the screw referenced 19 by its head.

It is possible to see the holes 21 in which are inserted the pivot pins 15 and the pivoting tubes 17, a bearing face 13B of the gripping shoulder on which is gripped the second block 12B. 14A is the face for gripping the block 12A against the gripping shoulder 13.

It is also possible to see the smooth hole 22 by which the gripping screw 19 traverses the block 11 and the tapped hole 23 of the second gripping plate 20A by which the screw is screwed down.

FIG. 3 also shows in broken line form a gripping spacer 24 and a supplementary block 25. The spacer 24 is positioned facing the gripping face 14A of the first gripping block 12A on which it can be secured. On the other side, it can bear on another gripping part of the supplementary block 25. Therefore the latter can bear by a gripping part 25A on the gripping block 11.

This supplementary block 25 is integral with a tube 26 concentric to a pivot pin 15 and a pivoting tube 17. Its supplementary tube 26 also has a gripping lever 18 identical to the other levers.

Thus, it is possible to add gripping points by placing in the two stacks a given number N-2 of supplementary blocks 25 and the same number N-2 of gripping spacers 24 in order to obtain a multipoint clamping system with 2.N gripping points.

Figure 1:
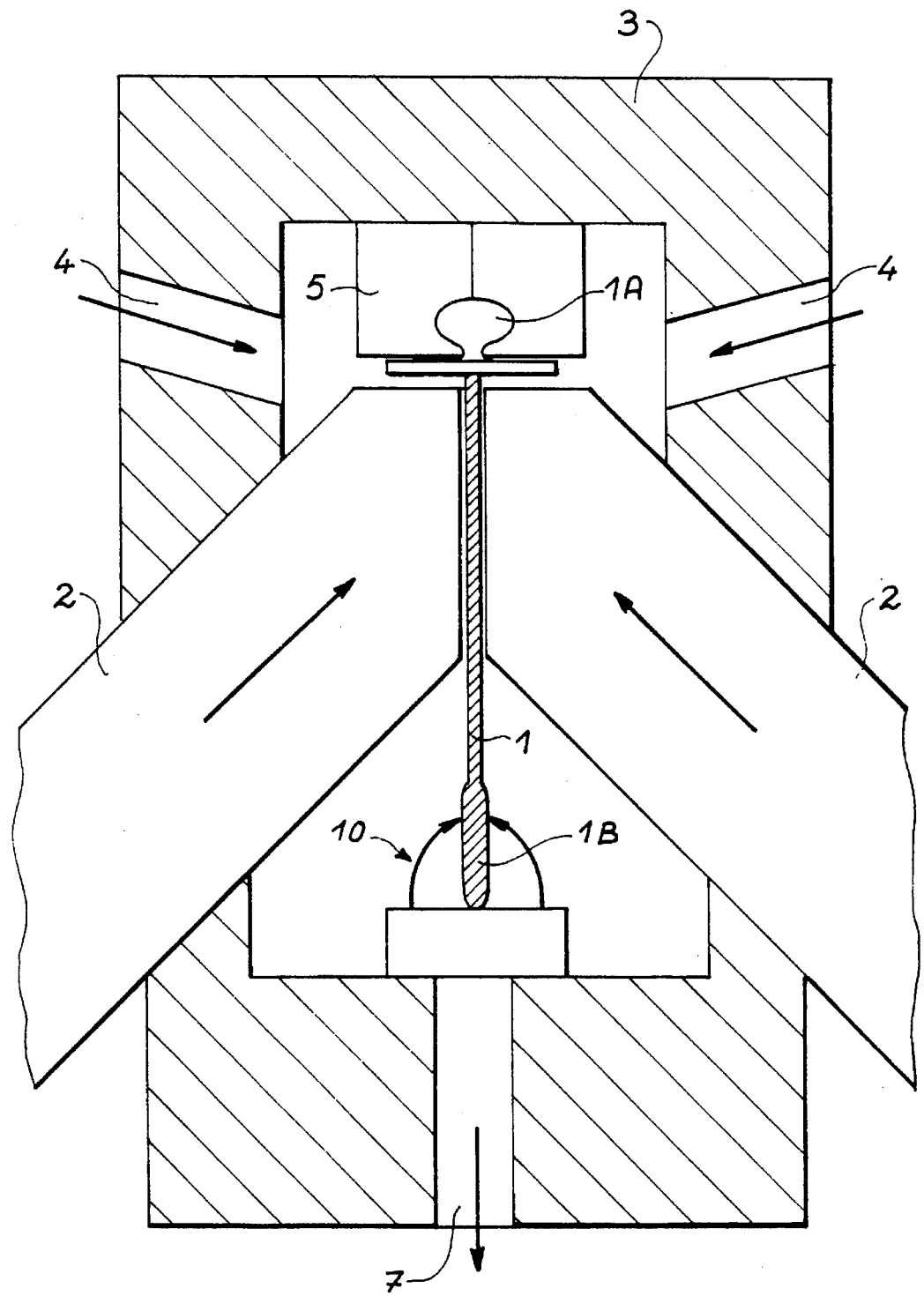
FIG. 1 shows, in section, the use of the clamping device according to the invention.

With reference to FIGS. 1 and 2, it is pointed out that a preferred use of such a clamping device is that of maintaining in the electrochemical machining position a turbo-jet blade and so as in particular to retain its free end 1B. Thus, bearing in mind that its final thickness can be approximately 0.5 mm, such a clamping action prevents the blade 1 from vibrating under the pressure of the electrochemical fluid flow. Thus, there is a quality improvement and a manufacturing cost reduction by means of such a clamping action, so that such turbo-jet blades can be produced in large numbers.

I claim:

1. Device for clamping a free, flat portion of a part to be worked in order to completely immobilize the part during work thereon, which comprises:

a base; and a multiple-point gripping mechanism gripping a free portion of the part at several points distributed on opposite sides of the free portion, said gripping mechanism including a pivot pin and a base having a gripping shoulder, said gripping mechanism incorporating on said sides of the free portion of the part a first gripping block mounted in an offset manner on a first end of said pivot pin, said pivot pin being pivotable in said gripping shoulder of the base, a first lever mounted at a second end of the pivot pin in such a way that pressure on the lever results in pressure from the first block being coupled to a face of the free portion of the part so as to maintain the free portion of the part between the two gripping shoulders and a single lock locking the gripping mechanism in a gripping position.

2. Clamping device according to claim 1, wherein the lock includes the two gripping shoulders of the base wherein, in each of said shoulders is mounted in a rotary manner the pivot pin, a gripping screw traversing the base and oriented parallel to the pivot pin and a first plate in which is screwed the gripping screw and which is gripped against a gripping face of the first gripping block.

3. Clamping device according to claim 1, which comprises a second gripping block mounted in offset manner on a first end of a pivoting tube and mounted so as to be pivotable about the pivot pin of the first gripping block, a second lever fitted at a second end of the pivoting tube in such a way that pressure on the levers results in pressure of each block being applied on one face of the free portion of the part, so as to maintain at four points the free portion of the part between the two gripping shoulders.

4. Clamping device according to claim 3, wherein the lock includes the two gripping shoulders of the base and in each of which is mounted in a rotary manner the pivot pin surrounded by a pivoting tube, a gripping screw traversing the base parallel to the pivot pins and pivoting tubes, a first plate in which is screwed the gripping screw and which is gripped against a gripping face of the first block and a second plate, which is free in translation on a second end of the gripping screw in proximity with the head of the latter in order to be gripped against one face of the second block, in such a way as to grip via the screw the blocks against the gripping shoulders in order to obtain a four-point clamping.

5. Clamping device according to claim 1, wherein the gripping mechanism includes on either side thereof supplementary blocks, each supplementary block being fitted in an offset manner on a supplementary pivoting tube concentric with the pivot pin and to a first pivoting tube and wherein the lock includes on either side thereof gripping spacers, so as to grip each block against one of the gripping spacers and one of the gripping shoulders.

6. A method of using a device for clamping a free, flat portion of a part to be worked in order to completely immobilize said part during work thereon, which comprises:

a base; and multiple-point gripping mechanism gripping a free portion of the part at several points distributed on opposite sides of the free portion, said gripping mechanism including a pivot pin and a base having a gripping shoulder, said gripping mechanism incorporating on said sides of the free portion of the part a first gripping block mounted in an offset manner on a first end of said pivot pin, said pivot pin being pivotable in said gripping shoulder of the base, a first lever mounted at a second end of the pivot pin in such a way that pressure on the lever results in pressure from the first block being coupled to a face of the free portion of the part so as to maintain the free portion of the part between the two gripping shoulders and a single lock locking the gripping mechanism in a gripping position, wherein the part to be worked comprises a root portion of a turbine engine blade and the method includes holding the root portion, which has been secured, during final machining of the sides of the blade by electrochemistry.

* * * * *